US008888175B2

(12) United States Patent
Dobrusin et al.

(10) Patent No.: US 8,888,175 B2
(45) Date of Patent: Nov. 18, 2014

(54) SLIDE-OUT BED POD

(75) Inventors: Elijah Dobrusin, Santa Maria, CA (US); Nevenka Prijic, Kirkland (CA); Eric Long, Kirkland (CA); Scott Savian, Huntington Beach, CA (US)

(73) Assignee: Zodiac Seat Shells US LLC, Santa Maria, CA (US)

( * ) Notice: Subject to any disclaimer, the term of this patent is extended or adjusted under 35 U.S.C. 154(b) by 466 days.

(21) Appl. No.: 13/287,945

(22) Filed: Nov. 2, 2011

(65) Prior Publication Data
US 2012/0104165 A1 May 3, 2012

Related U.S. Application Data

(60) Provisional application No. 61/409,660, filed on Nov. 3, 2010.

(51) Int. Cl.
A47C 13/00 (2006.01)
B64D 11/06 (2006.01)

(52) U.S. Cl.
CPC ........ *B64D 11/06* (2013.01); *B64D 2011/0658* (2013.01); *Y02T 50/46* (2013.01)
USPC ....... 297/63; 297/411.3; 297/217.1; 297/255; 297/256.1; 244/118.6

(58) Field of Classification Search
CPC ............... B64D 2011/0069; B64D 2011/0658; B64D 2011/062; B64D 11/06
USPC .............. 297/63–66, 411.3, 217.1; 244/118.6
See application file for complete search history.

(56) References Cited

U.S. PATENT DOCUMENTS

| | | | |
|---|---|---|---|
| 4,735,456 A * | 4/1988 | Haefelfinger | 297/62 |
| 6,375,119 B2 * | 4/2002 | Park et al. | 244/118.5 |
| 7,517,010 B2 * | 4/2009 | Saint-Jalmes et al. | 297/118 |
| 7,578,471 B2 * | 8/2009 | Beroth | 244/118.6 |
| 8,177,165 B2 * | 5/2012 | Bettell | 244/118.6 |
| 8,622,345 B2 * | 1/2014 | Collins et al. | 244/118.6 |
| 2001/0003962 A1 * | 6/2001 | Park et al. | 108/140 |
| 2003/0057323 A1 | 3/2003 | Keogh | |
| 2005/0012363 A1 | 1/2005 | Ferry | |
| 2007/0170310 A1 | 7/2007 | Bock | |
| 2008/0116318 A1 | 5/2008 | Wesley | |
| 2008/0185887 A1 | 8/2008 | Merensky | |
| 2009/0166470 A1 * | 7/2009 | Dryburgh et al. | 244/118.6 |
| 2009/0302158 A1 * | 12/2009 | Darbyshire et al. | 244/118.6 |
| 2010/0193634 A1 * | 8/2010 | Hankinson et al. | 244/118.6 |
| 2010/0301162 A1 * | 12/2010 | Hankinson | 244/118.6 |
| 2011/0186682 A1 * | 8/2011 | Collins et al. | 244/118.6 |

OTHER PUBLICATIONS

International Search Report and Written Opinion issued in related PCT/US2011/059011 on Mar. 9, 2012.

* cited by examiner

*Primary Examiner* — Laurie Cranmer
(74) *Attorney, Agent, or Firm* — Kilpatrick Townsend & Stockton LLP; Dean W. Russell, Esq.; Tiffany L. Williams, Esq.

(57) ABSTRACT

A pod assembly for use in an aircraft that includes a seat with a seat bottom and a seat back, a shell that at least partially surrounds the seat, and a bed associated with the shell. The bed is movable between a stowed position and a deployed position where the bed is generally flat. The bed is supported by the shell in the deployed position.

13 Claims, 13 Drawing Sheets

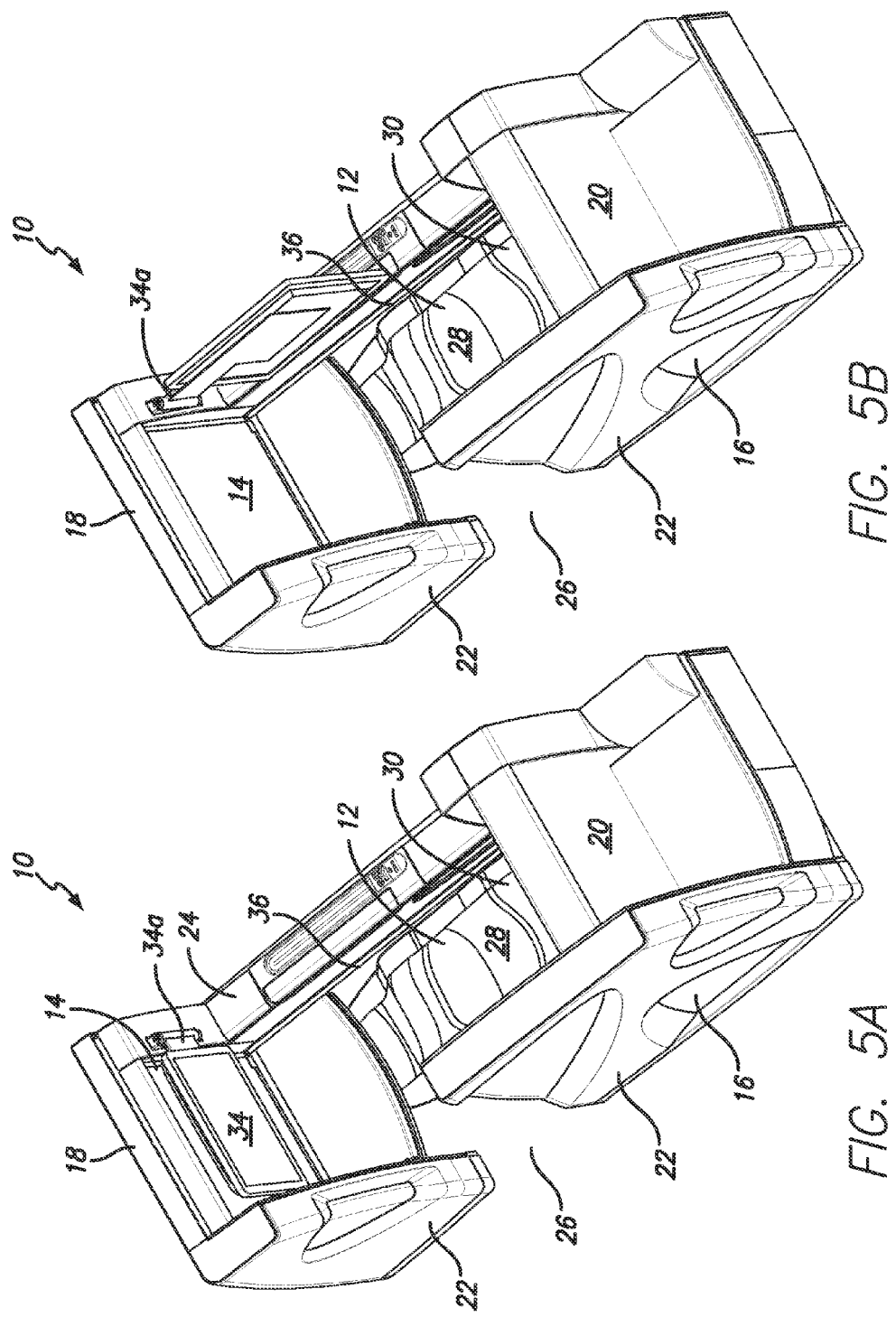

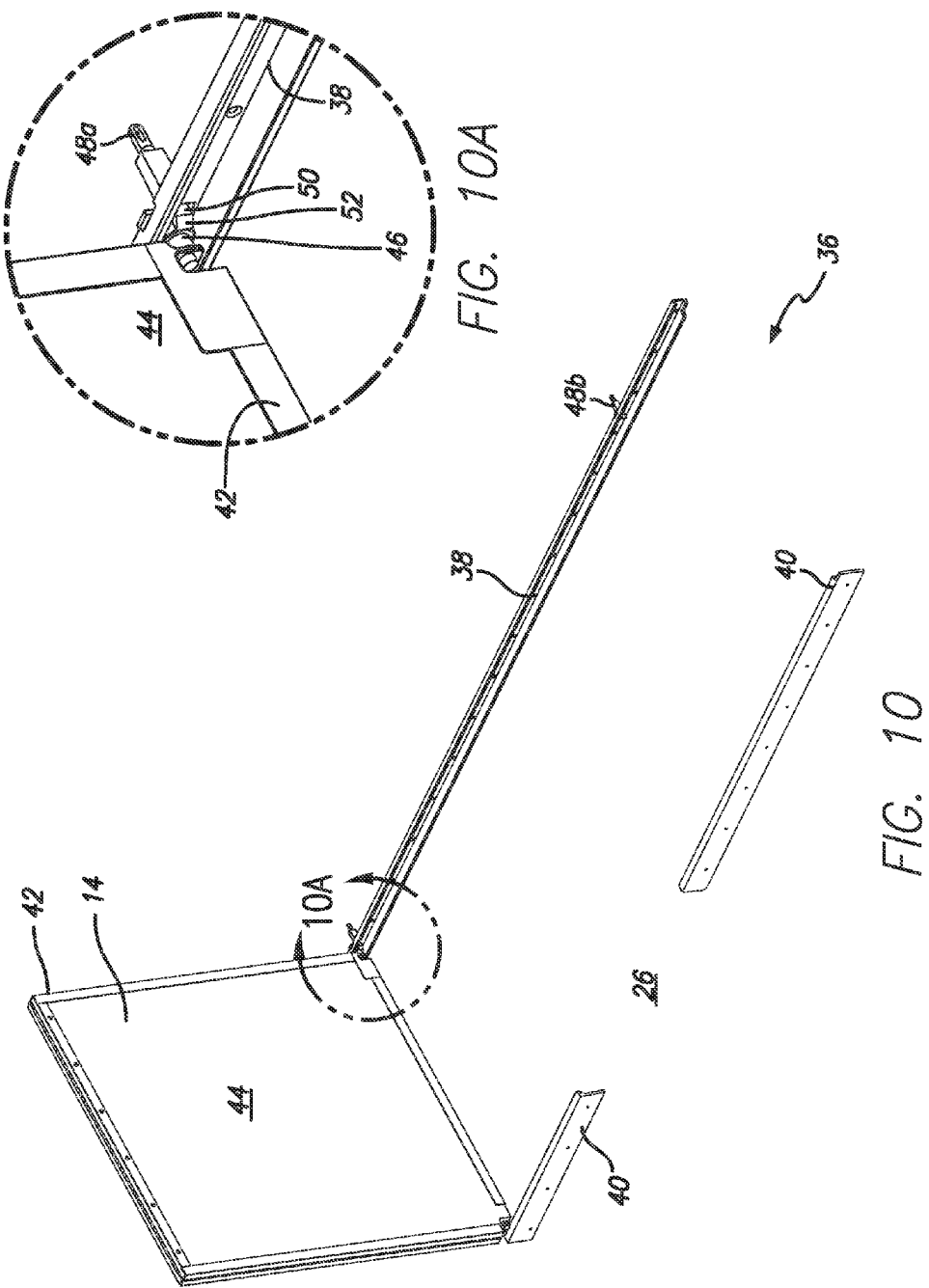

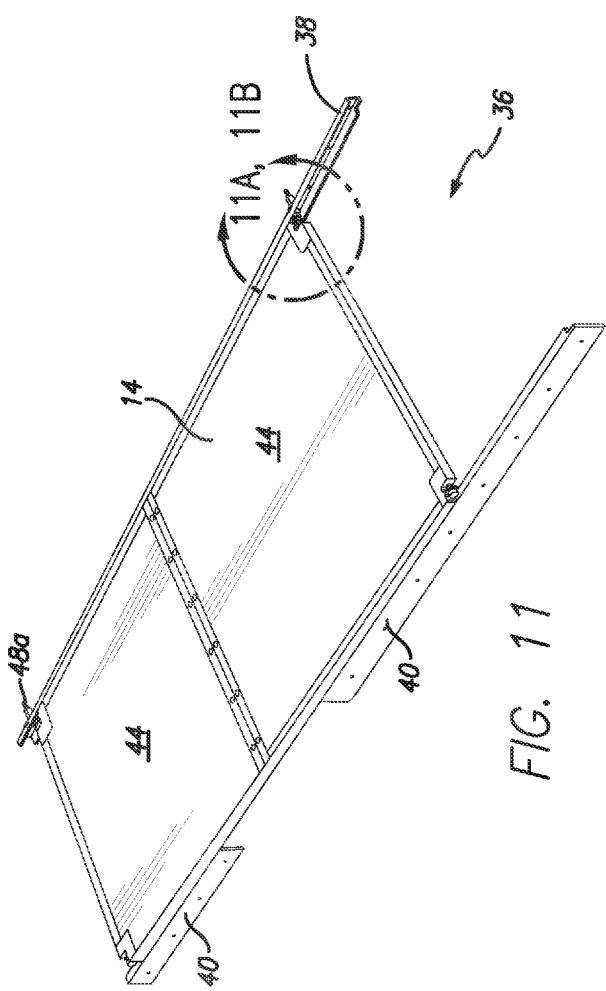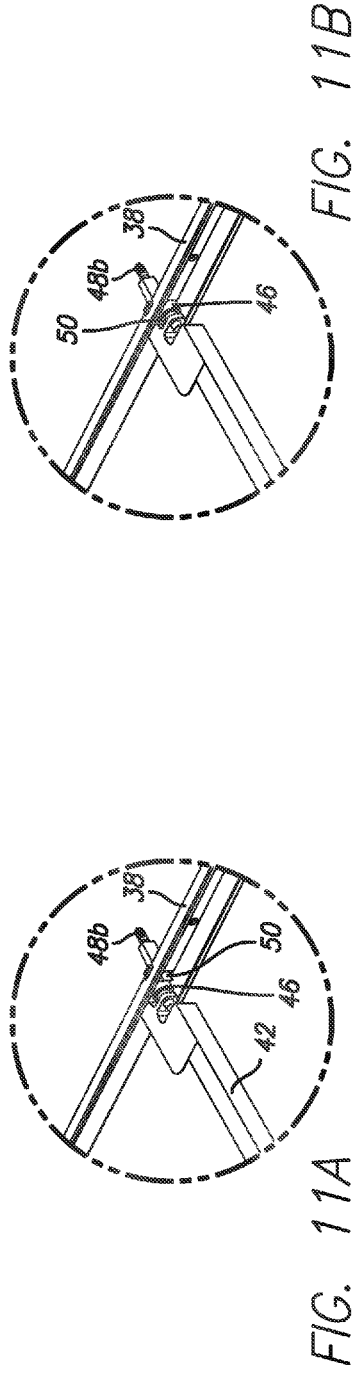

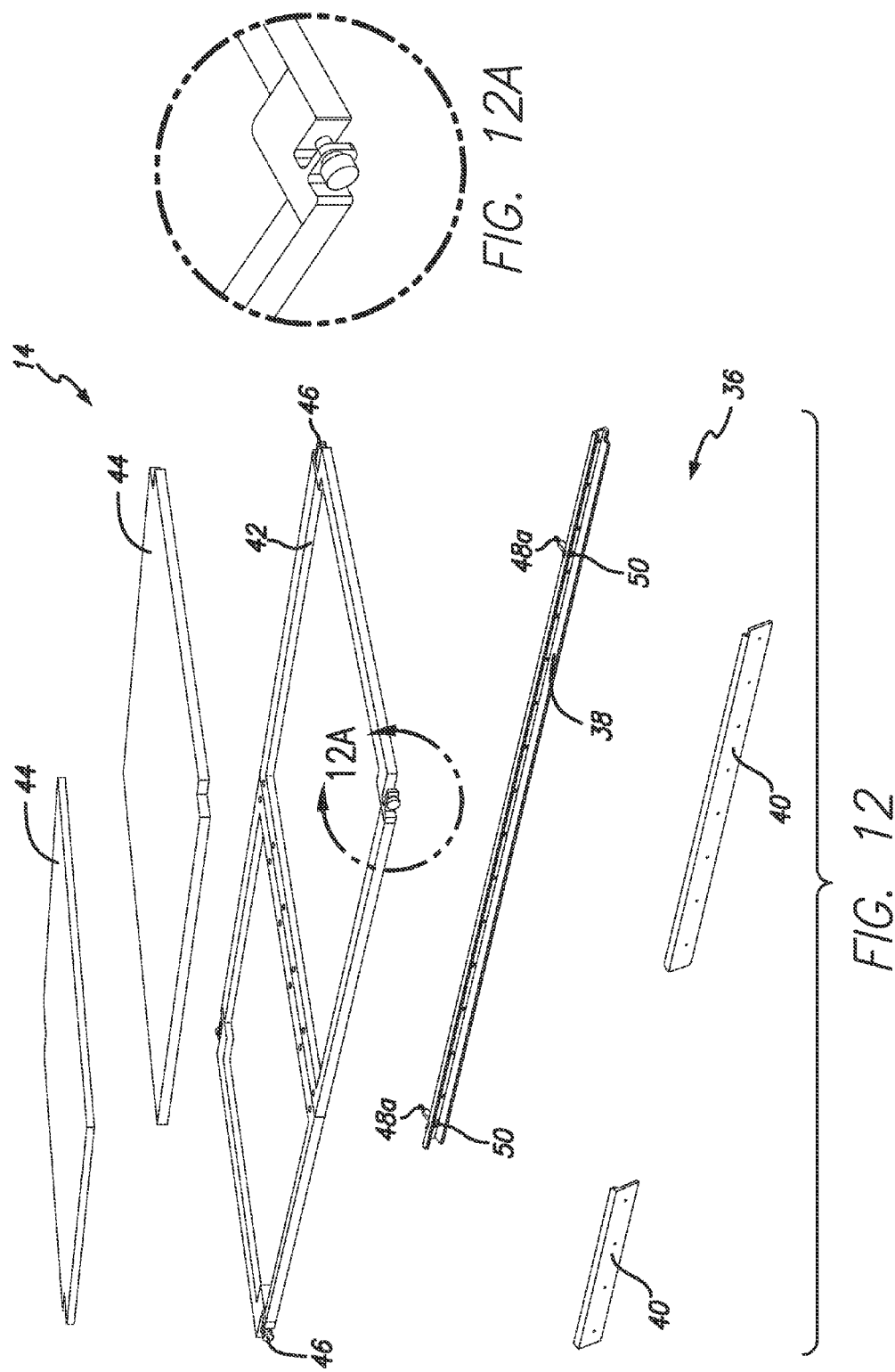

SLIDE-OUT BED POD

CROSS REFERENCE TO RELATED APPLICATIONS

This application claims the benefit of U.S. Provisional Application No. 61/409,660, filed Nov. 3, 2010, which is herein incorporated by reference in its entirety.

FIELD OF THE INVENTION

This invention relates to a seating and bed pod assembly/unit for passenger transportation vehicles. In particular, the invention provides a pod assembly with a separate bed and seat for passenger aircraft suites.

BACKGROUND OF THE INVENTION

On most current commercial airline suites, particularly in first class, a seat or chair is used for both sitting upright as well as sleeping because the chair converts into the bed. Unfortunately, an ideal chair is contoured and concaved to fit a seated body while an ideal bed is completely flat. Moreover, seat cushions are often too firm for ideal sleeping comfort. It is generally not possible to achieve an ideal bed and chair from a single product. One position or the other is generally compromised.

Airlines often choose one position over the other as the priority. Typical seats are usually heavy, complex electromechanical systems that move from a seated position to a bed position. It will be appreciated by those skilled in the art, that, in the present invention, by using a separate bed, a prior art seat that transforms between upright and bed positions does not need to be used (however, it may be if desired). This allows the use of a simple mechanical seat without the need for electromechanical actuators, substantially reducing the cost and weight of installing a passenger suite. Because an electromechanical actuation system is the most prone to reliability and service issues, simplifying the seat can improve the overall reliability of the suite.

Some solutions involve storing a separate bed portion next to a passenger seat, in a closet or in another area of the aircraft. While in use as a seat, the bed is stored in the side ledge area of a seating compartment, closet or elsewhere. A passenger convenience area, with cupholders and storage bins, may be provided in the side ledge area while the bed is stored. When converted into a sleeping position, the bed is deployed over the seat and is usually supported, in part, by the seat. Because the bed deploys from the side ledge area, the passenger convenience area becomes inaccessible while in the sleeping position. Moreover, such a design requires a specially manufactured seat and bed structures that are fully integrated with each other, creating significant design and manufacturing expense.

SUMMARY OF THE PREFERRED EMBODIMENTS

In accordance with one aspect of the present invention, there is provided a pod assembly for use in an aircraft that includes a seat with a seat bottom and a seat back, a shell that at least partially surrounds the seat, and a bed associated with the shell. The bed is movable between a stowed position and a deployed position where the bed is generally flat. The bed is supported by the shell in the deployed position. In a preferred embodiment, the bed is not supported by the seat in the deployed position. Preferably, the shell includes a front wall and at least one side wall and the bed is associated with the front wall, such that the bed deploys from the front wall toward the seat and is at least partially supported by the side wall in the deployed position by a track secured to an inner surface of the side wall. The bed includes structure that cooperates with the track as the bed unfolds from the stowed position to the deployed position.

In a preferred embodiment, in the deployed position the bed defines a bed footprint and the seat is movable between a deployed position where the seat back is positioned within the bed footprint and a stowed position wherein the seat back is not positioned within the bed footprint. In the stowed position, the seat back is in an upright position and extends above a plane defined by a top surface of the bed when the bed is in the deployed position. In another embodiment, in the stowed position, the seat back and seat bottom are positioned below a plane defined by a top surface of the bed in the deployed position. In a preferred embodiment, the seat includes armrests that are movable between a deployed position and a stowed position. In the deployed position, at least a portion of the armrests extends above the bed footprint, and in the stowed position the armrests are positioned below the bed footprint.

In accordance with another aspect of the present invention, there is provided a method that includes providing a pod assembly that includes a seat having a seat bottom and a seat back, a shell that at least partially surrounds the seat, and a bed associated with the shell. The bed is movable between a stowed position and a deployed position where the bed is generally flat and is supported by the shell. In the deployed position the bed defines a bed footprint. The method further includes moving the seat from a deployed position where the seat back is positioned within the bed footprint to a stowed position where the seat back is not positioned within the bed footprint, and moving the bed from the stowed position to the deployed position. In a preferred embodiment, the pod assembly includes a video monitor, and the method further includes moving the monitor from a deployed position where it is adjacent to the bed in the stowed position and a stowed position where it is not adjacent the bed in the stowed position before deploying the bed.

In accordance with another aspect of the present invention, there is provided a pod assembly for use in an aircraft that includes a shell having front, rear and first and second side walls, and a bed associated with the front wall of the shell. The bed is movable between a stowed position and a deployed position where the bed is generally flat, and the bed is supported by at least the first and second side walls in the deployed position. The first wall includes an opening therein to allow passengers to enter or exit the shell. In a preferred embodiment, the bed is folded in the stowed position and deploys from the front wall toward the rear wall.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 5A is a perspective view of the pod assembly of FIG. 1 with a chair that lays flat in the stowed position;

FIG. 5B is a perspective view of the pod assembly of FIG. 5A that illustrates pivoting of the monitor to the non-viewing position so the bed can be deployed;

FIG. 10 is a perspective view of the bed and support structure of the pod assembly of FIG. 1 with the bed in the stowed position;

FIG. 10A is a detailed view of the forward retaining latch of the support structure shown in FIG. 10;

FIG. 11 is a perspective view of the bed and support structure of the pod assembly of FIG. 1 with the bed in the deployed position;

FIGS. 11A and 11B are detailed views of the aft retaining latch of the support structure shown in FIG. 11 and showing the latch before and after securing the bed in the deployed position;

FIG. 12 is an exploded perspective view of the bed and support structure of the pod assembly of FIG. 1; and FIG. 12A is a detailed view of the roller of the support structure shown in FIG. 12;

Like numerals refer to like parts throughout the several views of the drawings.

DETAILED DESCRIPTION OF THE PREFERRED EMBODIMENTS

Figure 1:
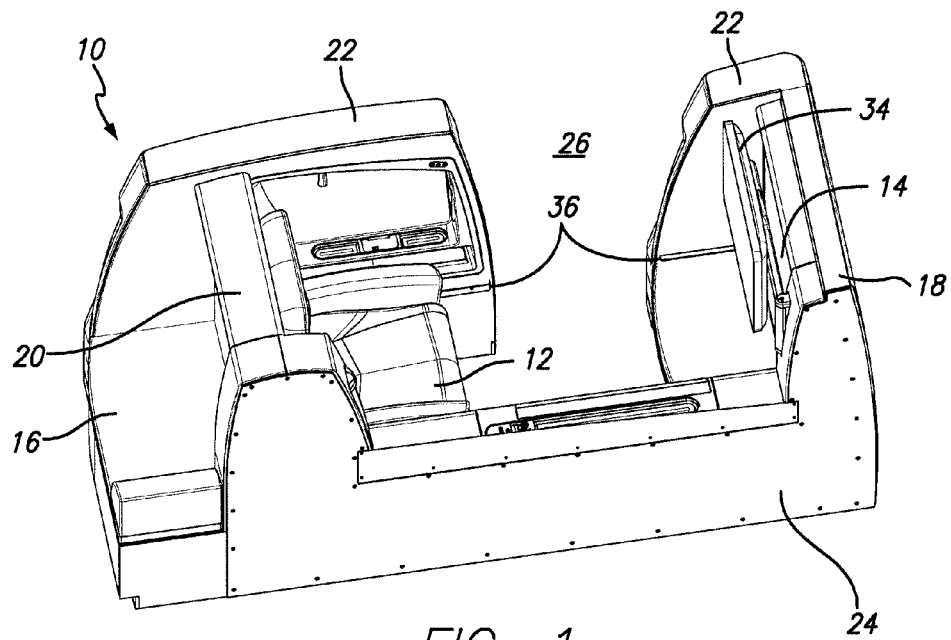
FIG. 1 is a perspective view of a pod assembly having a separate bed and seat in accordance with a preferred embodiment of the present invention, showing the seat in the taxi, take-off and landing (TTL) position.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "left," "right," "above," "fore," "aft" and "side" used herein are merely for ease of description and refer to the orientation of the components as shown in the figures. It should be understood that any orientation of the components described herein is within the scope of the present invention. Furthermore, it should be understood that the use of the terms forward or fore and aft refer to the orientation of the pod assembly and components described herein within an aircraft that typically has seats facing forward.

As shown in FIGS. 1-12A, the present invention is preferably directed to a pod assembly 10 that includes a separate seat 12 and bed 14. In particular, the invention provides a bed 14 and seat 12 for passenger aircraft suites. The pod assembly 10 is typically used in an aircraft, however, this is not a limitation on the present invention, and the pod assembly can be used in other passenger transportation vehicles or in other environments.

In a preferred embodiment, the pod assembly 10 includes a shell 16 that includes a front or forward wall 18, a back or aft wall 20 and first and second side walls 22 and 24 with the separate seat 12 and bed 14. The first side wall 22 includes an opening 26 therein through which a passenger can enter and exit the shell 16. Preferably, the seat 12 is a reclining mechanical seat that includes a seat bottom 28 and a seat back 30. In a preferred embodiment, the pod assembly 10 also includes armrests 32 and a video monitor 34. It will be appreciated by those skilled in the art that the pod assembly 10 can include other amentities, such as a storage cabinet, cup holder, storage pocket, lights, a foldable and/or stowable tray table, a remote control, game controller, volume and channel controls and the like.

Figure 2A:
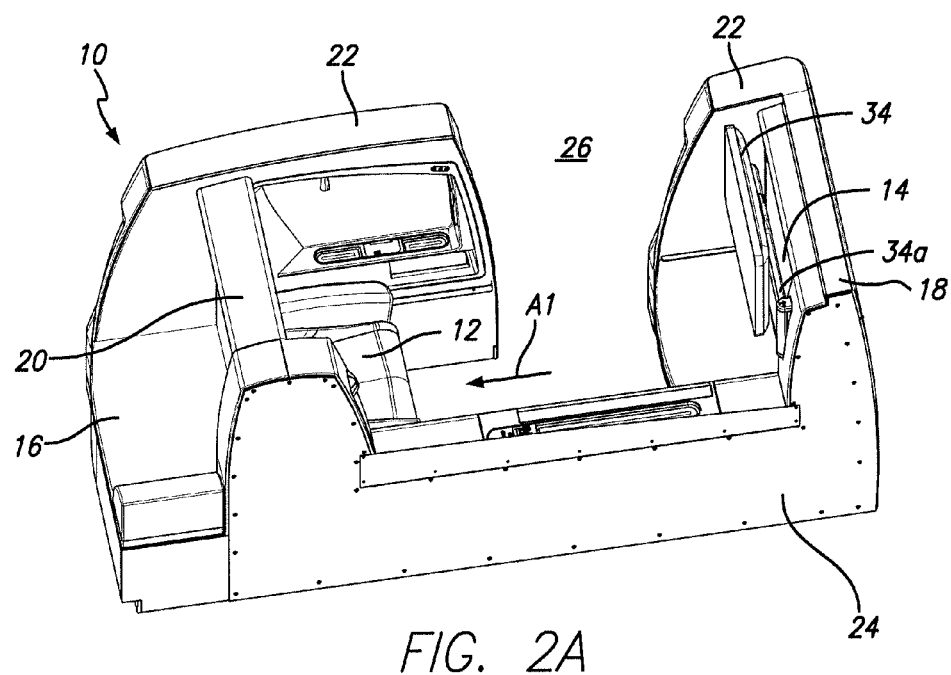
FIG. 2A is a perspective view of the pod assembly of FIG. 1 with the seat in the stowed position.

The seat 12 is movable between a taxi, takeoff and landing (TTL) position (FIG. 1), a relaxed position (not shown), and a stowed position (FIG. 2A). The TTL position and relaxed position are also referred to herein together as the deployed position. The bed 14 is movable between a stowed position (FIGS. 1-2B) and a deployed position (FIG. 2D). When a passenger is seated during a flight, the seat 12 is normally in the deployed position and the bed 14 is normally in the stowed position. However, when a passenger desires to sleep, the bed 14 must be moved from the stowed position to the deployed position.

It should be understood that while the seat 12 is being used in the deployed position, the bed 14 is folded away in the stowed position and stored against the front wall 18 of the shell 16, behind the monitor 34 and opposite from the seat 12 and rear wall 20. Generally, when the bed 14 is to be used, the bed 14 is released from the front wall 18 and unfolded into a completely flat sleeping surface (the deployed position). In a preferred embodiment, the bed 14 is completely independent structurally from the seat 12 and is supported entirely by a bed supporting structure 36 installed in the shell 16. In the deployed position, the bed 14 is completely above the level of the top of the seat bottom 28. Thus, in a preferred embodiment, neither the seat bottom 28 nor any other part of the seat 12 provides any support to the bed 14.

To help with the description herein the term "bed footprint" will be used. The bed footprint is the space occupied by the bed when it is in the deployed position.

Figure 3:
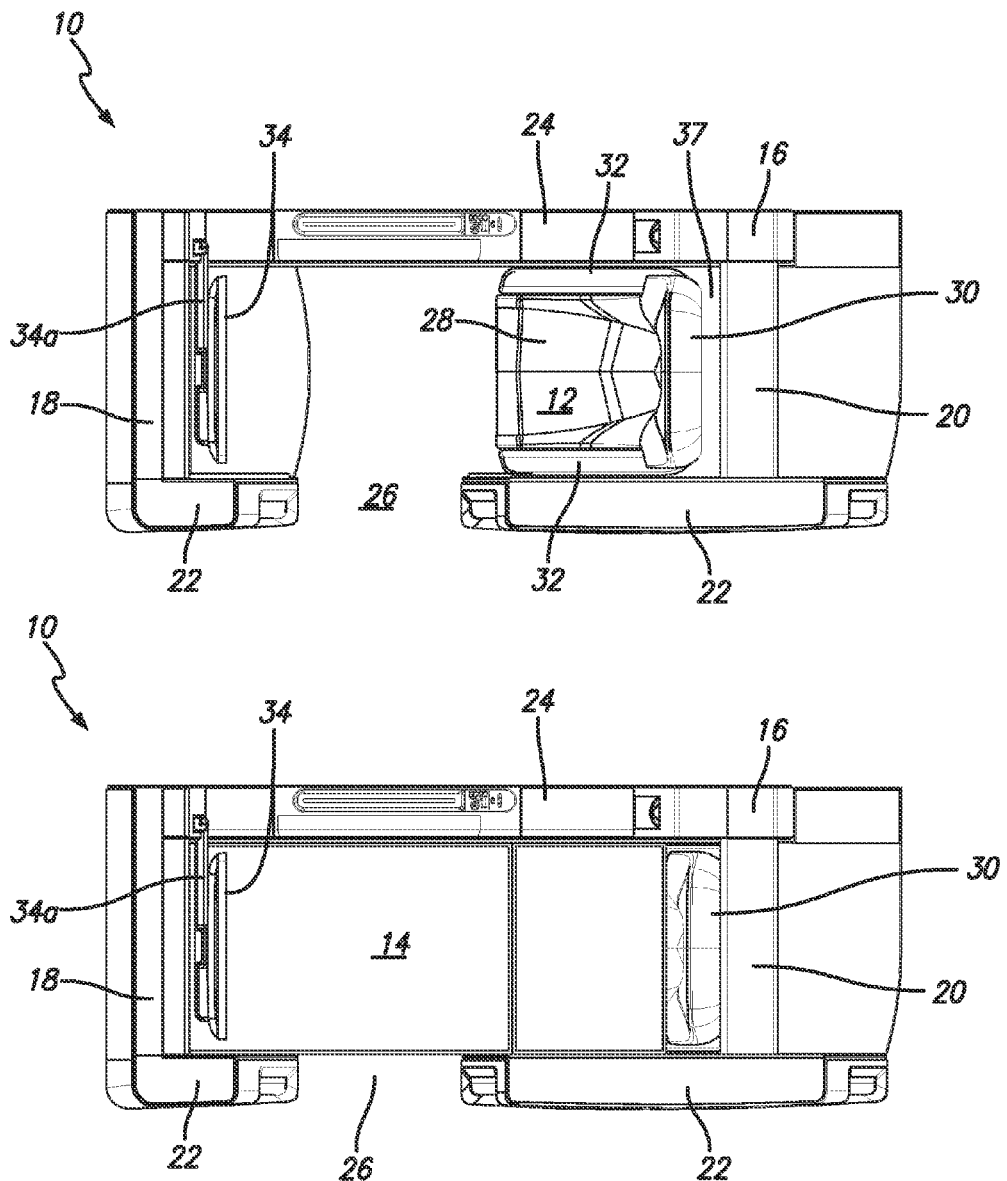
FIG. 3 is a top plan view of the pod assembly of FIG. 1 showing the pod assembly in the TTL configuration and the bed configuration.
Figure 4:
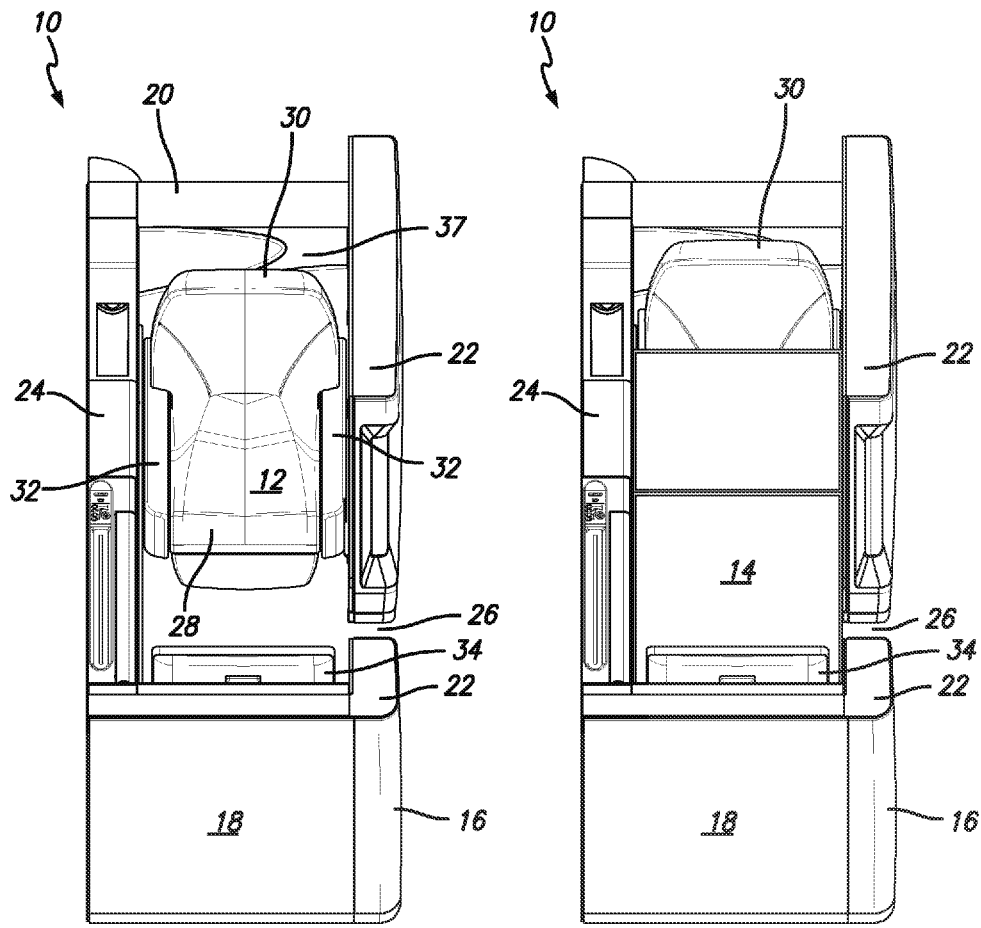
FIG. 4 is a top perspective view of the pod assembly of FIG. 1 showing the pod assembly in the TTL configuration and the bed configuration.

FIGS. 2A-2E show a series of steps for deploying the bed 14. FIG. 2A shows the first step of moving the seat 12 to the stowed position. This is done by moving the seat in the direction of arrow A1 and orients the seat back 30 in a more upright position than the TTL position so that the seat 12 is generally out of the way of the bed 14 and provides more room within the shell 16 for the bed 14 to be deployed. In other words, the seat 12 is moved to the stowed position so that the seat back 30 is not positioned within the bed footprint, but still extends above a plane defined by the bed footprint or a plane defined by the top surface of the bed when the bed is in the deployed position. As is shown in FIGS. 3 and 4, in a preferred embodiment, moving the seat 12 to the stowed position closes the gap 37 between seat back 30 and the back wall 20. The seat 12 can be moved to the stowed position on a track on the aircraft deck via a lever, later or the like, or via an automated mechanism, such as a passenger control unit (PCU). In another embodiment, the seat stowed position can be omitted, and the bed 14 can be deployed without moving the seat 12. As shown in FIG. 2A, because the armrests 32 are positioned at a height above the position where the bed 14 is supported in the deployed position (i.e., the bed footprint), the armrests 32 are lowered so as not to interfere with the deployment of the bed 14. In other words, the armrests 32 also have a deployed position (up) and a stowed position (lowered). In a preferred embodiment, the armrests 32 are lowered via the PCU and are electromechanically. Alternatively the armrests 32 can be mechanical armrests 32 that use a release and then require the passenger to physically drop the or raise the armrest 32. In another embodiment, the armrests 32 can be positioned permanently below the bed footprint and thus do not have to be lowerable.

Figure 2B:
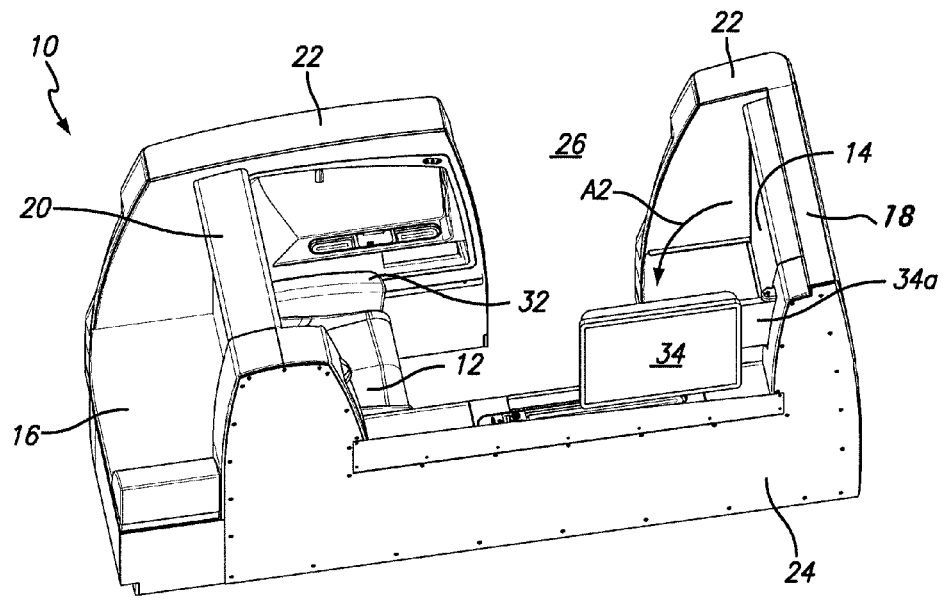
FIG. 2B is a perspective view of the pod assembly of FIG. 1 that illustrates pivoting of the monitor to the non-viewing position so the bed can be deployed.

FIG. 2B shows the second step of releasing and pivoting or rotating the monitor 34 from the viewing position to the non-viewing position (see arrow A2) so that the monitor 34 is out of the way of the path defined by the bed as it is deployed. As is shown in FIG. 2A, in a preferred embodiment, the bed 14 is stored behind the monitor 34. Therefore, the monitor 34 must be moved out of the way to deploy the bed 14. In a preferred embodiment, the monitor 34 is connected to an arm 34a that is pivotally connected to the shell 16 by a hinge or the like. Any means for moving the monitor 34 from the viewing position (deployed) to the non-viewing (stowed) position is within the scope of the present invention.

Figure 2C:
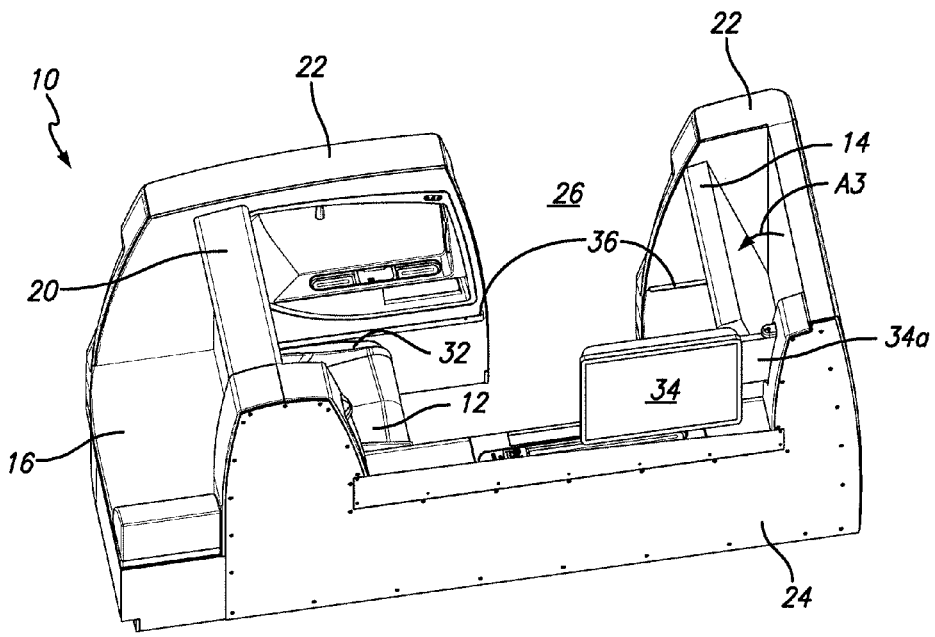
FIG. 2C is a perspective view of the pod assembly of FIG. 1 showing the bed being released and deployed.
Figure 2D:
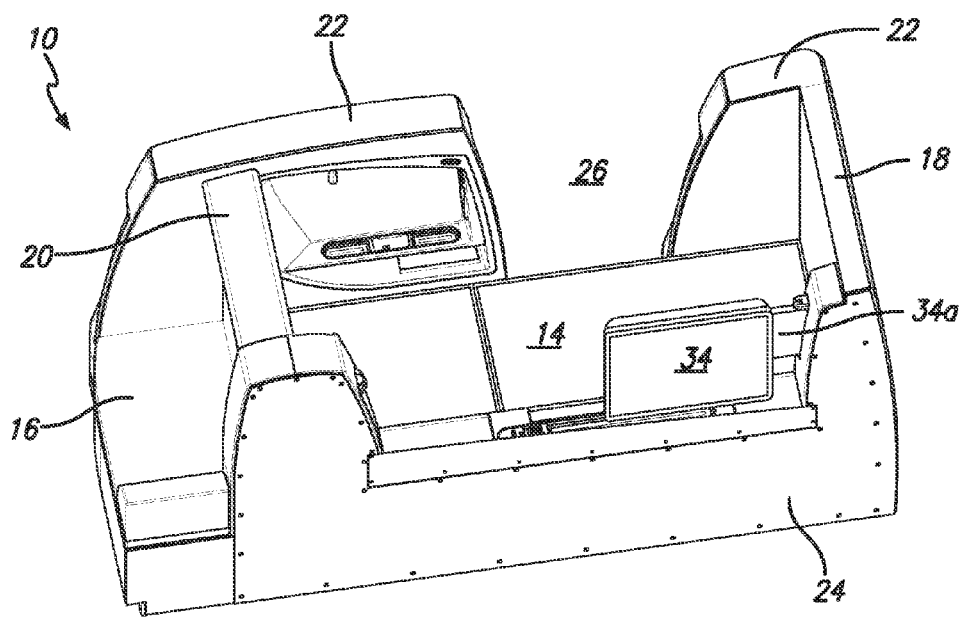
FIG. 2D is a perspective view of the pod assembly of FIG. 1 showing the bed being secured in the deployed position.
Figure 2E:
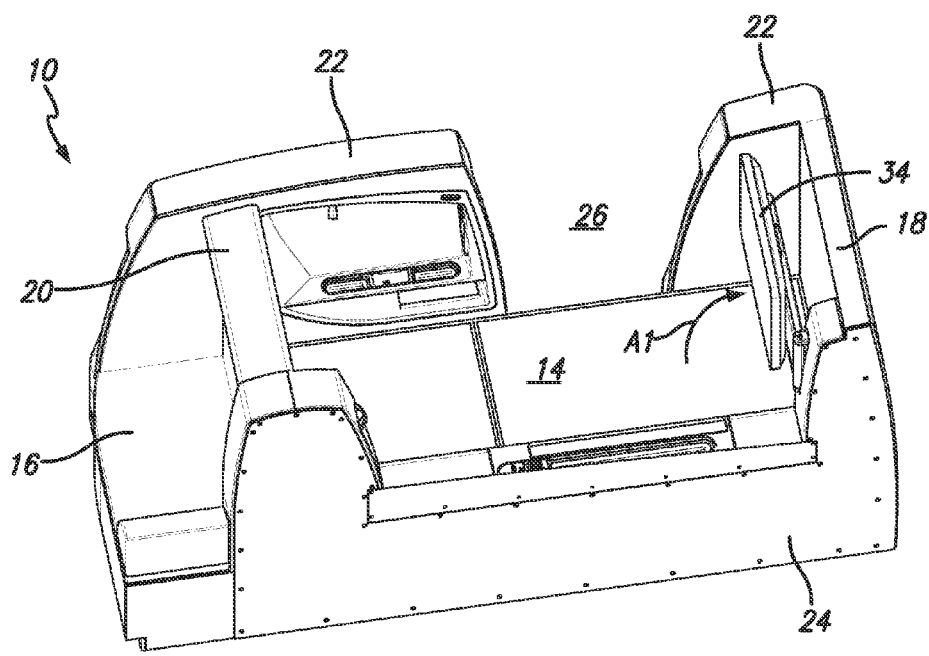
FIG. 2E is a perspective view of the pod assembly of FIG. 1 that illustrates pivoting of the monitor to its viewing position.

FIG. 2C shows the third step of releasing and beginning to deploy the bed 14 (see arrow A3). FIG. 2D shows the fourth step of securing the bed 14 in the deployed position. FIG. 2E shows the final step of returning the monitor 34 back to the viewing or deployed position (see arrow A4). It will be understood that the monitor 34 does not have to be returned to the viewing position, but that it can be if the passenger desires. In a preferred embodiment, the seat 12 is moved to the stowed position by lifting by hand near the center of the bed 14, thus folding the bed 14. Alternatively the bed 14 can be moved by motor and the deployment and stowing of the bed can all be controlled by a control panel by the passenger or flight attendant.

Figures 5C, 5D:
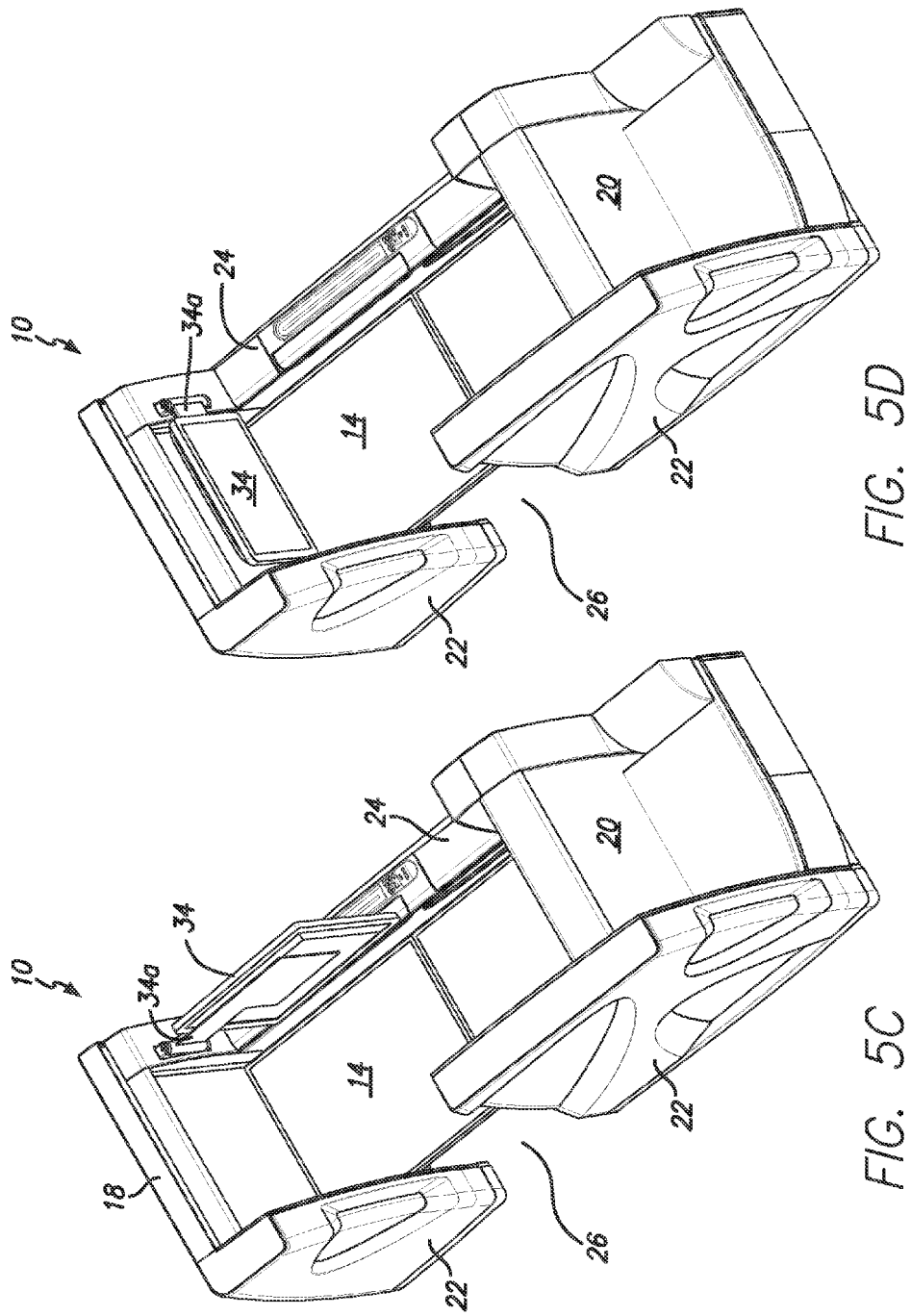
FIG. 5C is a perspective view of the pod assembly of FIG. 5A showing the bed in the deployed position.
FIG. 5D is a perspective view of the pod assembly of FIG. 5A that illustrates pivoting of the monitor back to the viewing position.
Figure 6:
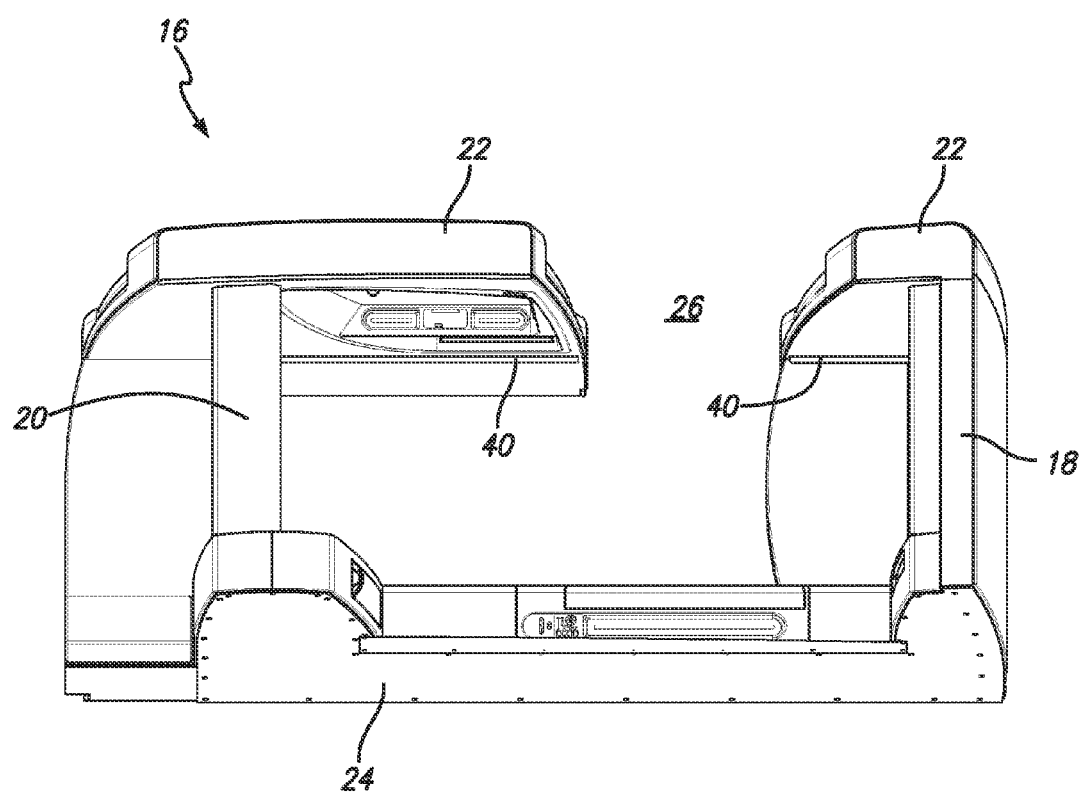
FIG. 6 is a perspective view of the pod assembly of FIG. 1 with the bed and seat removed.

FIGS. 5A-5D show another embodiment of the present invention where the seat 12 moves between a deployed position (just like FIG. 1 above) to a stowed position where the seat back 30 lies generally flat. In this embodiment, the seat back 30 may be reclined so that it lies flat and below the plane at which the bed 14 is supported in the deployed position (below the bed footprint). The seat 12 can be moved to the stowed position by the seat back 30 reclining and the seat bottom 28 remaining stationary or by a combined movement of the seat back 30 reclining and the seat bottom 28 moving generally horizontally. Any method of moving the seat 12 to a flat position is within the scope of the present invention. In this embodiment, the bed 14 can be stowed against the forward wall 18 or the aft wall 20 (behind the seat back 30), FIG. 5A shows the step of placing the seat 12 in the stowed position. FIG. 5B shows the step of moving the monitor 34 to the stowed position. FIG. 5C shows the bed 14 in the stowed position where it is positioned over the entire seat 12. FIG. 5D shows the bed 14 in the stowed position and the monitor 34 moved back to the viewable or deployed position.

As discussed above, in a preferred embodiment, the bed 14 and seat 12 are independent of one another. Therefore, any type of seat 12 can installed within the shell 16 provided at least a portion of the seat 12 (as described herein) can be lowered below the level of the bed support structure 36. In a preferred embodiment, the seat 12 is supported by a frame, which is in turn mounted to the deck of the aircraft by track fittings of a known type. For example, the seats 12 can be attached to the aircraft floor through seat track fittings which are mounted directly on the seat tracks that are mounted to or in the aircraft floor. This allows for any seat to be mounted within the shell 16 because it is independently mounted to the aircraft floor.

FIGS. 6-12A show a preferred embodiment of a structure for deploying and supporting bed 14. However, this particular structure is not a limitation on the present invention and other structures or ways of deploying and supporting the bed 14 will be understood by those skilled in the art and are within the scope of the present invention. The bed supporting structure 36 may comprise any known support structure including braces, brackets, columns, and various other types of support without limitation. The support can be provided from above, below, or in a cantilevered fashion. In FIGS. 1-12A, the support structure 36 is shown as a set of metal rails or tracks fastened to the interior surface of the walls of the shell 16 and is configured to support the weight of the bed 14 and a passenger lying on the bed 14.

As shown in FIG. 12, in a preferred embodiment, the supporting structure 36 includes a U-channel rail 38 and first and second L-channel rails 40 and the bed 14 includes a folding bed frame 42 and two bed panels 44. The bed 14 may also include a bed pad (not shown). The bed 14 is not limited to panels 44 and other known bed structures can be used without limitation. As is shown in FIGS. 10 and 11, the bed frame 42 is hinged or foldable in two separate halves. Other foldable configurations are within the scope of the invention.

The rails 38 and 40 are mounted along the interior of the side walls 22 and 24 of the shell 16, as shown. While the rails 38 and 40 are shown mounted on particular sides of the shell 16, either type of rail can be placed on any of the shell walls without limitation. Further, use of different types of rails is not required, and it is contemplated that only a single type of rail, for example the L-channel rail, can be exclusively used. Additionally, the support structure or the rails may be made from any suitable materials and are not limited to metal.

Figure 8:
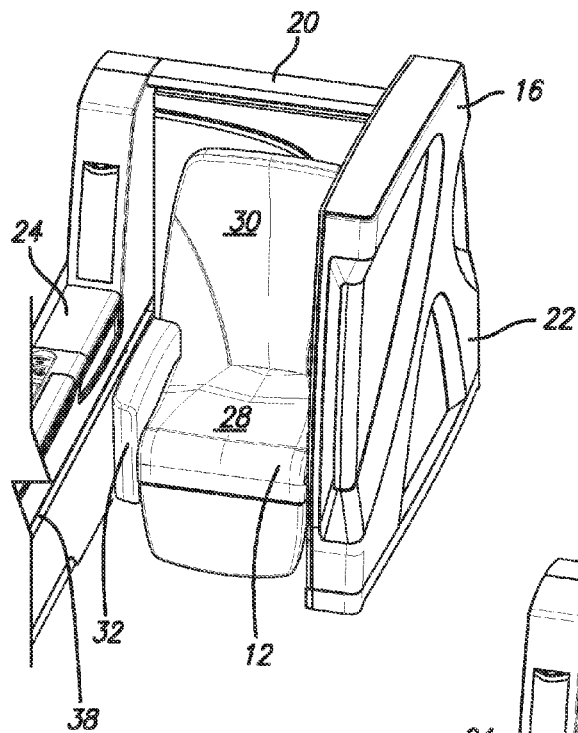
FIG. 8 is a perspective view of a portion of the pod assembly of FIG. 1 showing the seat in the stowed position.
Figure 9:
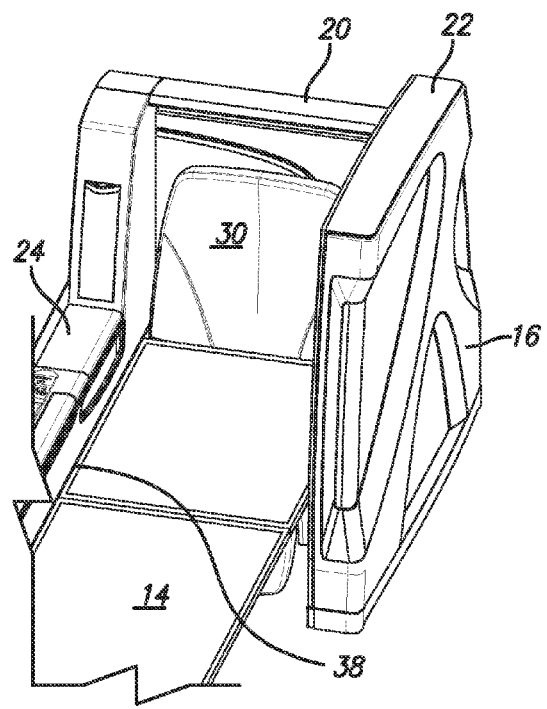
FIG. 9 is a perspective view of a portion of the pod assembly of FIG. 1 showing the bed in the deployed position.

As shown in FIGS. 8 and 9, in a preferred embodiment, the rails 38 and 40 are mounted at a level above the position of seat bottom 28 in the embodiment of FIGS. 1A-1E, and above the flat seat 12 in the embodiment of FIG. 2, so that the seat 12 does not interfere with the bed 14 in the deployed position. The mounted rails 38 and 40 form a roller support track for supporting the weight of the bed 14 and guiding the bed 14 between the stowed and deployed positions.

Referring to FIGS. 10-12A, rollers 46 are installed on the four corners of the bed frame 42. Alternatively, rollers may be omitted. The rollers 46 are configured to removably engage with the rails 38 and 40 of the supporting structure 36 so that the rollers 46 roll along the rails as the bed 14 converts between the stowed and deployed positions. In another embodiment, the bed frame 42 only includes rollers at the aft end. In another embodiment, the bed frame 42 can include components other than rollers for gliding or moving along the supports or track. Alternatively, the bed frame 42 may slide or rest on the supports or track without gliding or rolling.

In a preferred embodiment, the structure 36 includes forward and aft retaining latches 48a and 48b that are associated with the rails to lock or secure the bed 14 in both the stowed (see FIG. 10A) and deployed (see FIGS. 11A-11B) positions. The bed supporting structure 36 can include forward and aft retaining latches 48a and 48b on one or both sides of the shell 16. The retaining latches 48a and 48b can be spring biased. In the embodiment shown in the figures, the retaining latches 48a and 48b include a latch portion 50 that has an angled surface 52. With this configuration, for aft retaining latch 48b, as the bed is deployed and the roller 46 contacts the angled surface 52 (see FIG. 11B), the latch portion 50 will be depressed until the roller 46 passes the latch portion 50. At this point, the latch portion 50 is biased back into place behind the roller 46, thus securing the bed 14 in the deployed position (see FIG. 11A). With this configuration, for forward retaining latch 48a, as the bed is stowed and the roller 46 contacts the angled surface 52 (see FIG. 10A), the latch portion 50 will be depressed until the roller 46 passes the latch portion 50. At this point, the latch portion 50 is biased back into place in front of the roller 46, thus securing the bed 14 in the stowed position.

Figure 7:
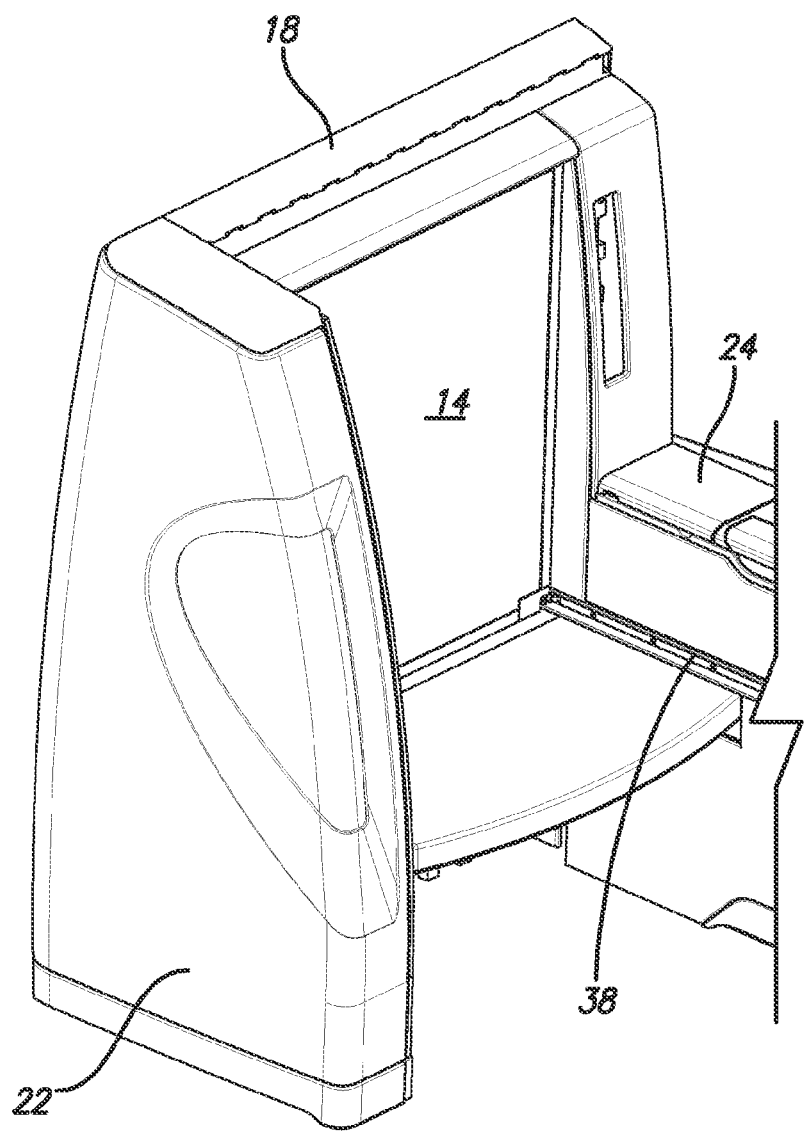
FIG. 7 is a perspective view of a portion of the pod assembly of FIG. 1 showing the bed in the stowed position.

While in the stowed position, the bed 14 is folded along its width so that the bed can be stored against the wall 18 furthest away from the seat 12, as is shown in FIG. 7. In the folded position, the rollers 46 on either end of the bed 14 are positioned adjacent to each other within the supporting structure rails 38 and 40. And, as discussed above, one or more forward retaining latches 48a in the rails 38 and 40 hold the bed 14 in the folded position. Alternatively, retaining latches may be omitted and other known methods of securing panels such as by straps, hooks, barriers, and fasteners can be used without limitation. When the bed is converted into the deployed position, the rollers 46 on the head or aft end of the bed 14 glide along the supporting structure rails 38 and 40 away from the wall and towards the seat 12. The feet or forward end of the bed 14 remains locked in position against the forward wall 18. This causes the bed to unfold into a flat position. Once fully unfolded, the aft retaining latch(es) 48b are engaged to lock the bed 14 into the deployed position (see FIG. 11B).

In another embodiment, the support structure can be positioned so that the bed is supported by the seat bottom 28 or the flattened seat bottom 28 and seat back 30.

It will be appreciated by those skilled in the art that the independent design of the seat and bed allows the seat and the bed to be manufactured and installed separately. This allows more flexibility for airlines for ordering and installing the seating pod assemblies. For example, an initial order of seating pods can be installed into an aircraft with just the seats. If the airline decides at a later time to provide beds in some or all of the seating pods, the beds can be separately ordered and easily installed into the existing seating pod assemblies without any downtime. The airline can also remove the beds or distribute a number of beds among the pods in any manner that best accommodates the needs of the airline.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A pod assembly for use in an aircraft, the assembly comprising:
   a seat having a seat bottom and a seat back,
   a shell that at least partially surrounds the seat, wherein the shell includes a front wall and at least one side wall, and
   a bed associated with the front wall of the shell, wherein the bed is movable between a stowed position where the bed is folded and a deployed position where the bed is unfolded and generally flat,
   wherein the bed deploys from the front wall toward the seat and is supported by the shell and is at least partially supported by the side wall of the shell in the deployed position, and
   a video monitor movable between a deployed position where it is positioned adjacent the front wall and a stowed position where it is not adjacent to the front wall, and wherein the video monitor must be moved to the stowed position in order to move the bed from the stowed position to the deployed position.

2. The pod assembly of claim 1 wherein the bed is not supported by the seat in the deployed position.

3. The pod assembly of claim 2 wherein in the deployed position the bed defines a bed footprint, wherein the seat is movable between a deployed position where the seat back is positioned within the bed footprint and a stowed position wherein the seat back is not positioned within the bed footprint.

4. The pod assembly of claim 3 wherein in the stowed position, the seat back is in an upright position and extends above a plane defined by a top surface of the bed when the bed is in the deployed position.

5. The pod assembly of claim 3 wherein in the stowed position, the seat back and seat bottom are positioned below a plane defined by a top surface of the bed in the deployed position.

6. The pod assembly of claim 3 wherein the seat includes armrests that are movable between a deployed position and a stowed position, wherein in the deployed position, at least a portion of the armrests extends above the bed footprint and in the stowed position the armrests are positioned below the bed footprint.

7. The pod assembly of claim 1 wherein the at least one side wall includes a track secured to an inner surface thereof, and wherein the bed includes structure that cooperates with the track as the bed unfolds from the stowed position to the deployed position.

8. The pod assembly of claim 7 wherein the shell includes first and second side walls that each include a track secured to an inner surface thereof, wherein the bed includes at least two rollers, and wherein the rollers move along the track as the bed unfolds from the stowed position to the deployed position.

9. The pod assembly of claim 8 wherein the bed is not supported by the seat in the deployed position.

10. A method comprising the steps of:
    (a) providing a pod assembly that includes a seat having a seat bottom and a seat back, a shell that at least partially surrounds the seat, a bed associated with the shell, and a video monitor, wherein the bed is movable between a stowed position and a deployed position where the bed is generally flat and is supported by the shell, wherein in the deployed position the bed defines a bed footprint, wherein the seat back extends above the bed footprint when the bed is in the deployed position, (b) moving the seat from a deployed position where the seat back is positioned within the bed footprint to a stowed position where the seat back is not positioned within the bed footprint, (c) moving the video monitor from a deployed position where it is adjacent the bed in the stowed position and a stowed position where it is not adjacent the bed in the stowed position, and (d) moving the bed from the stowed position to the deployed position.

11. The method of claim 10 wherein the bed is not supported by the seat in the deployed position.

12. A pod assembly for use in an aircraft, the assembly comprising:

a shell that includes front, rear and first and second side walls, wherein the first side wall includes an opening therein to allow passengers to enter or exit the shell, a bed associated with the front wall of the shell, wherein the bed is movable between a stowed position where the bed is folded and a deployed position where the bed is unfolded and generally flat, wherein the bed deploys from the front wall and is supported by at least the first and second side walls in the deployed position, and a video monitor movable between a deployed position where it is positioned adjacent the front wall and a stowed position where it is not adjacent to the front wall, and wherein the video monitor must be moved to the stowed position in order to move the bed from the stowed position to the deployed position.

13. The pod assembly of claim 12 the first and second side walls each include a track secured to an inner surface thereof, wherein the bed includes at least two rollers, and wherein the rollers move along the track as the bed unfolds from the stowed position to the deployed position.

* * * * *